United States Patent
Oga et al.

(10) Patent No.: US 7,597,079 B2
(45) Date of Patent: Oct. 6, 2009

(54) STARTING DEVICE OF ENGINE

(75) Inventors: Hirotsugu Oga, Shizuoka (JP); Mamoru Atsuumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 71 days.

(21) Appl. No.: 11/746,724

(22) Filed: May 10, 2007

(65) Prior Publication Data
US 2007/0266982 A1  Nov. 22, 2007

(30) Foreign Application Priority Data
May 18, 2006  (JP) .............................. 2006-139020

(51) Int. Cl.
*F02N 1/00* (2006.01)
(52) U.S. Cl. ............................................... 123/179.24
(58) Field of Classification Search ............ 123/179.24; 74/7 C, 5; 310/51, 67 R
See application file for complete search history.

(56) References Cited

U.S. PATENT DOCUMENTS
7,331,320 B2 * 2/2008 Asada ................... 123/179.24

2004/0255890 A1 * 12/2004 Tsutsumi et al. ....... 123/179.24

FOREIGN PATENT DOCUMENTS
JP    2001-045686    2/2001

* cited by examiner

*Primary Examiner*—Stephen K Cronin
*Assistant Examiner*—Keith Coleman
(74) *Attorney, Agent, or Firm*—Keating & Bennett, LLP

(57) ABSTRACT

In a starting device of an engine, a starter clutch is provided with an outer race that rotates with a rotor (starter member), and a cam interposed between the outer race and a starter gear. A through hole is formed in the rotor so as to face the outer race axially. A stepped section is provided between a radially outer portion of the outer race, the portion facing a radially outer edge of the through hole, and a radially inner portion of the outer race. The stepped section causes the radially outer portion to be thinner than the radially inner portion. The starting device is capable of ensuring a cooling capability of a stator coil even though the rigidity of the outer race is increased.

21 Claims, 9 Drawing Sheets

STARTING DEVICE OF ENGINE

BACKGROUND OF THE INVENTION

1. Field of the Invention

The present invention relates to a starting device of an engine for causing a starter motor to rotate an engine starting shaft through a starter clutch.

2. Description of the Related Art

A general starting device of an engine is provided with a starter gear rotated by a starter motor, a rotor of a generator connected to a crankshaft, and a starter clutch for transmitting rotary motion from the starter gear only to the rotor. The starter clutch has an outer race fixed to the rotor for rotation therewith and a cam interposed between the outer race and the starter gear.

In the generator, a cooling hole is defined for allowing air or cooling engine oil to pass therethrough after having cooled a stator coil disposed facing the rotor to thereby cool the stator coil (see JP-A-2001-45686 (Patent Document 1), for example).

In the conventional starting device, when an outer race of the starter clutch has an insufficient rigidity, the outer race may be deformed, which may result in slippage of the cam in some cases. This interferes with smooth starting of the engine.

For additional rigidity, increasing the outer race in a radial dimension is conceivable. However, when the outer race is increased simply in the radial dimension, the outer race may block the cooling hole in the rotor. This causes a problem of degradation in the cooling capability of the stator coil.

SUMMARY OF THE INVENTION

In order to overcome the problems described above, preferred embodiments of the present invention provide a starting device of an engine for ensuring the cooling capability of the stator coil when an outer race is increased in a radial dimension to enhance its rigidity.

According to a preferred embodiment of the present invention, a starting device for an engine includes a starter gear driven by a starter motor; a starter member connected to an engine starting shaft; and a starter clutch located between the starter member and the starter gear to transmit rotary motion from the starter gear only to a side of the starter member, in which the starter clutch is provided with an outer race that rotates with the starter member, and a clutch member interposed between the outer race and the starter gear; and the starter member has a through hole formed therein so as to axially oppose the outer race, and a stepped section is provided between a radial outer portion of the outer race, the radial outer portion facing a peripheral edge of the through hole at least at a radial distal end from a center of the starter member, and a radial inner portion of the outer race near the clutch member such that the stepped section causes the radial outer portion to be thinner than the radial inner portion, or a stepped section is provided in a portion of the starter member that faces the outer race, such that the stepped section causes a portion of the starter member in which the through hole is formed, to be thinner than a portion of the starter member near the engine starting shaft.

According to the starting device of a preferred embodiment of the present invention, the stepped section is provided either in the outer race at the portion facing the through hole in the starter member, or in the starter member at the portion in which the through hole is formed. Hence, even when the outer race has an outer diameter arranged to oppose the through hole, blockage of the through hole is prevented. This ensures the cooling capability of a stator coil, for example, when the rotor of the generator is the starter member.

According to preferred embodiments of the present invention, the outer diameter of the outer race is increased to such an extent so as to cause the outer race to axially face the through hole of the starter member, thereby enhancing the rigidity of the outer race while ensuring the cooling capability. Hence, slippage of a clutch member due to deformation of the outer race is prevented, which allows smooth engine starting.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
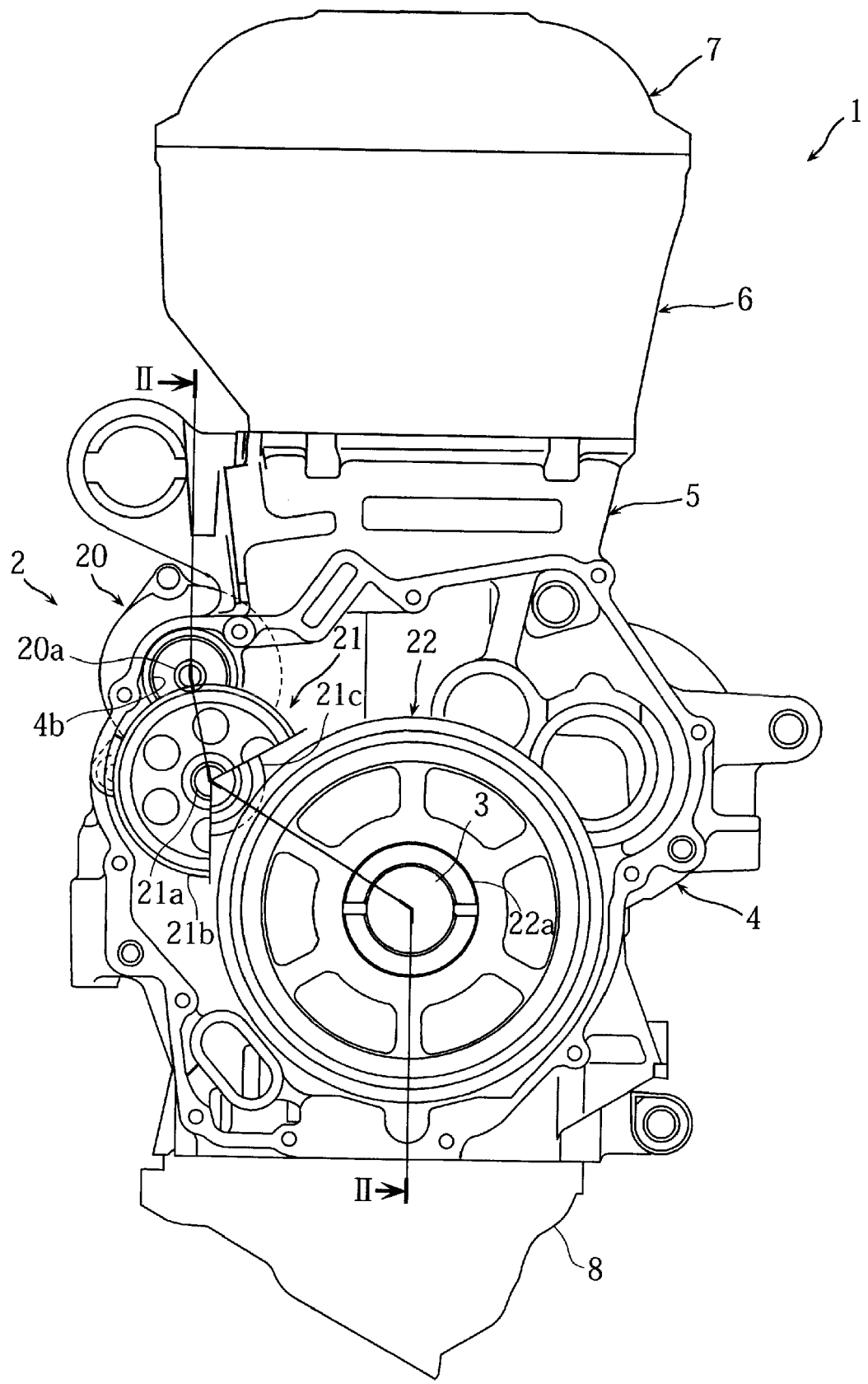
FIG. 1 is a side view of an engine provided with a starting device according to a first preferred embodiment of the invention, as viewed in an axial direction of a crankshaft.
Figure 2:
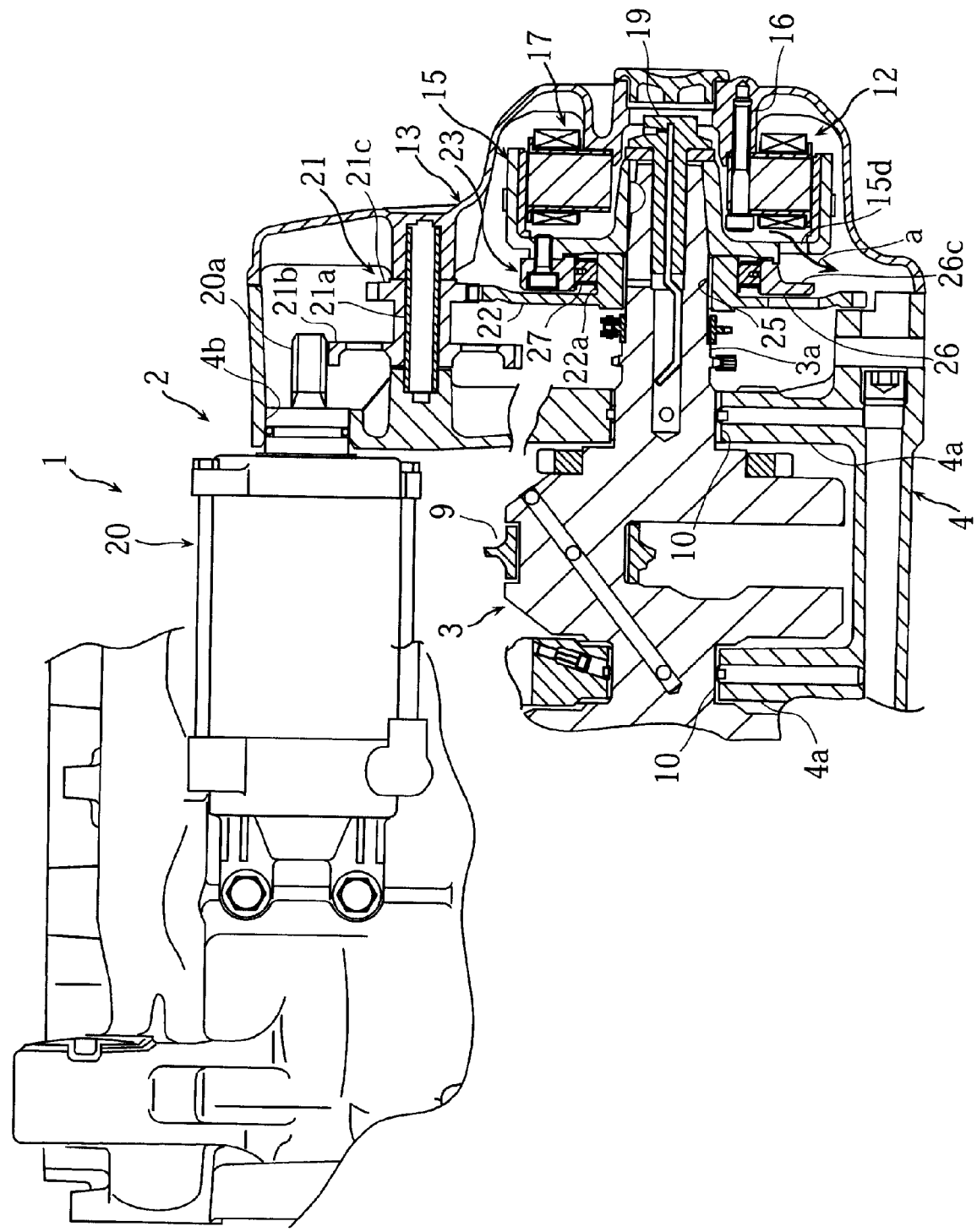
FIG. 2 is a cross-sectional view of the engine (taken along the line II-II of FIG. 1).
Figure 3:
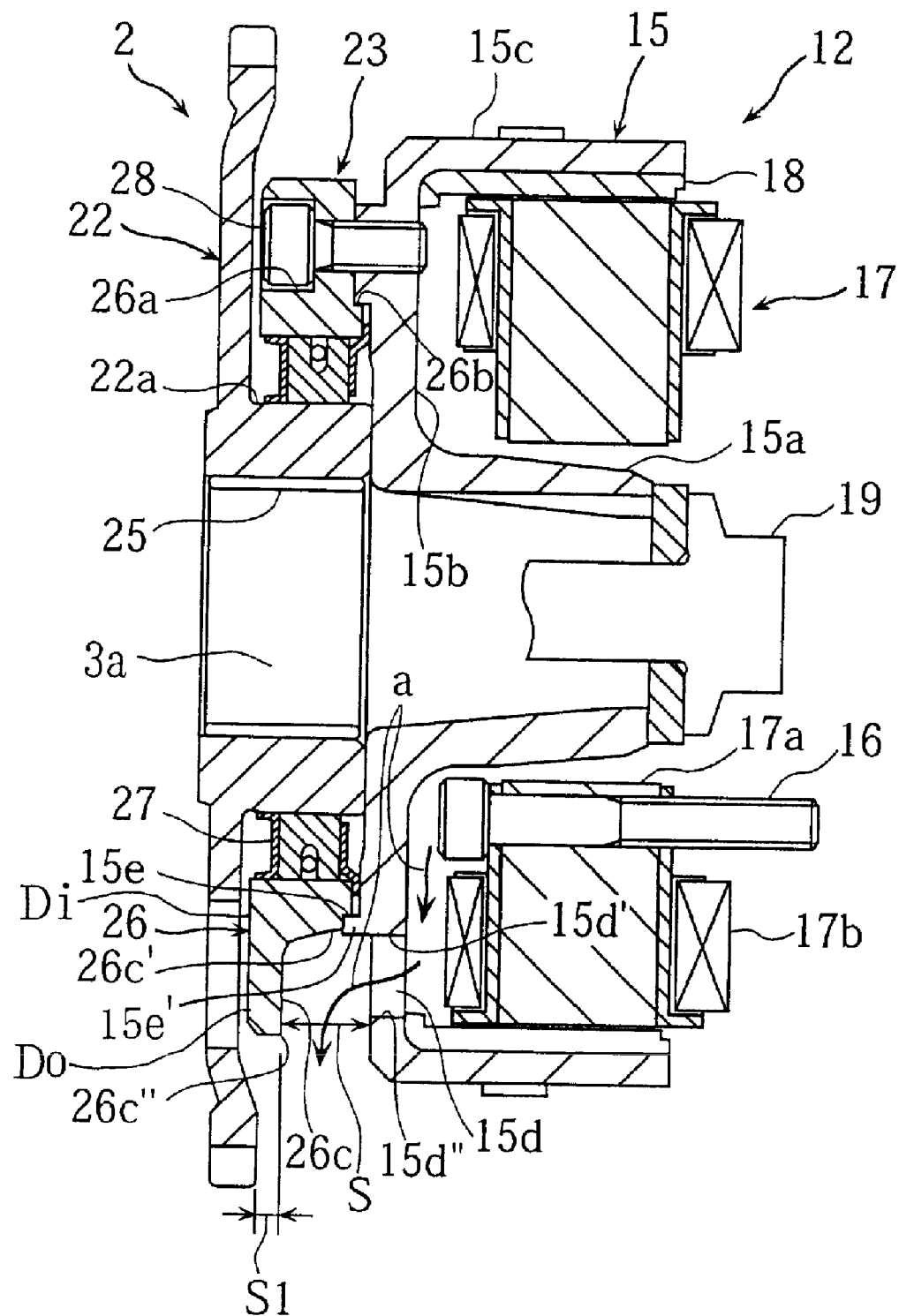
FIG. 3 is a cross-sectional view of a generator of the starting device.
Figure 4:
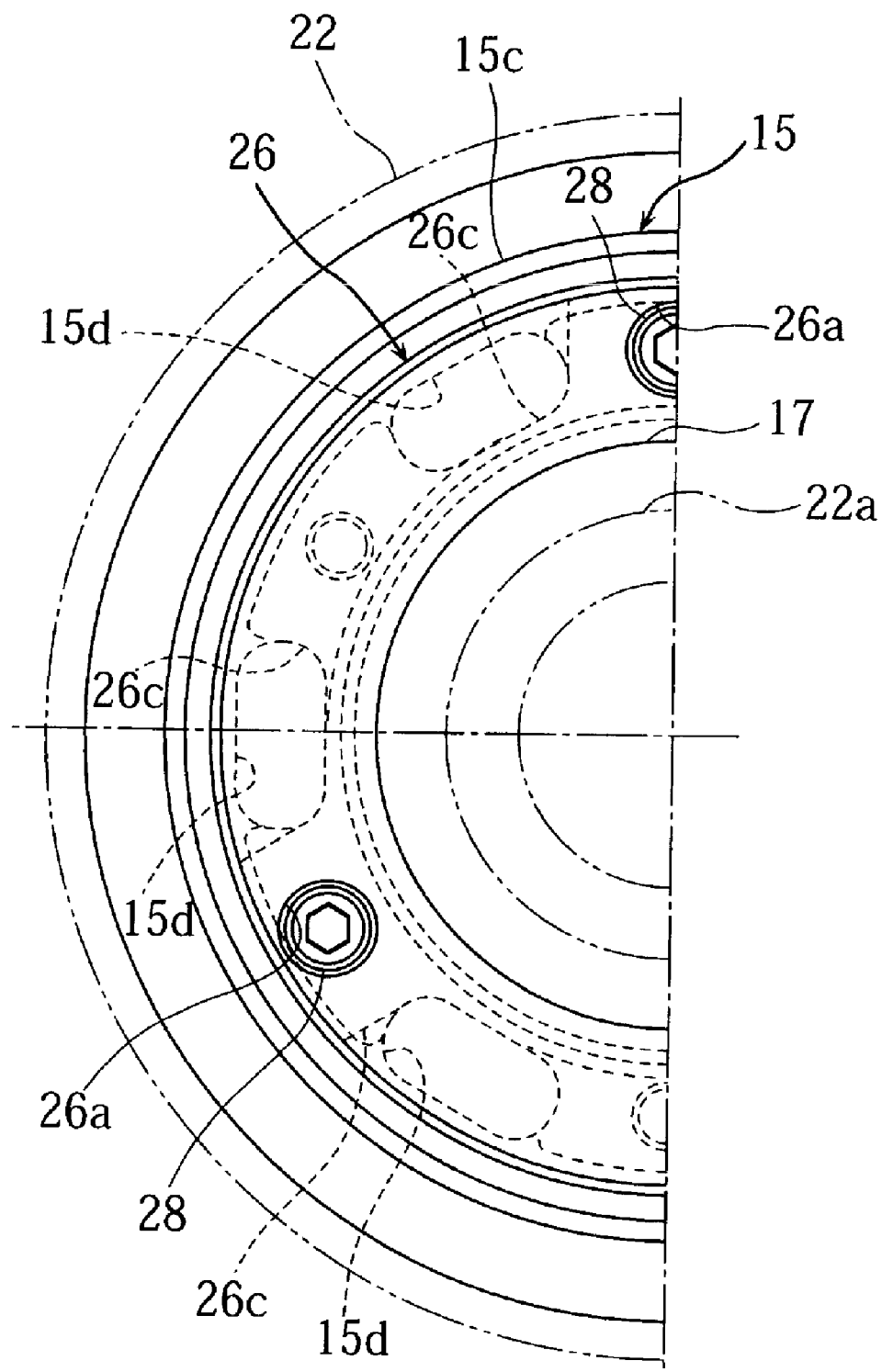
FIG. 4 is a side view of the starting device as viewed in the axial direction of the crankshaft.

Preferred embodiments of the present invention will be described hereinafter with reference to the drawings.

FIGS. 1 through 4 illustrate a starting device of an engine according to a preferred embodiment (first preferred embodiment) of the present invention.

In the drawings, reference numeral 1 denotes a four-stroke engine mounted in a small vehicle, such as a motorcycle, an off-road three/four-wheel vehicle, and a snowmobile, for example. The engine 1 has a structure schematically described below. A cylinder block 5 is provided on a crankcase 4 that houses a crankshaft 3 in one unit. A cylinder head 6 and a head cover 7 are placed on the unit in this order and connected thereto. An oil pan 8 is connected to a lower mating surface of the crankcase 4.

A piston (not shown) disposed within the cylinder block 5 is coupled to the crankshaft 3 via a connecting rod 9. The crankshaft 3 is supported for rotation on bosses 4a provided in the crankcase 4 through plain bearings 10.

An axial end 3a of the crankshaft 3 projects outward from the crankcase 4. A generator 12 is attached to the crankshaft end 3a. The generator 12 is covered in an air tight manner by a cover member 13 attached to the crankcase 4. FIG. 1 depicts the engine 1 from which the cover member 13 and the generator 12 are omitted.

The generator 12 has a rotor 15 attached to the crankshaft end 3a and a stator coil 17 attached to the cover member 13.

The rotor 15 has a tapered boss 15a that is fixed by key-engagement to the crankshaft 3 so as to rotate therewith, a disk-shaped flange 15b extending substantially perpendicularly to the axial direction of the crankshaft from an axially inner edge of the boss 15a, and an annular rotor 15c extending outward in an axial direction of the crankshaft to surround the stator coil 17 from an outer peripheral edge of the flange 15b. A magnet 18 is disposed on an inner circumferential surface of the rotor 15c. The rotor 15 is fixed immovably in the axial direction by a lock bolt 19 screwed into an end surface of the crankshaft end 3a.

The stator coil 17 is configured such that a coil 17b is wound around an iron core 17a fixed to the cover member 13 by a bolt 16. The stator coil 17 opposes the magnet 18 slightly spaced therefrom in a radial direction.

A plurality of through holes 15d circumferentially spaced at regular intervals are formed in the flange 15b of the rotor 5 at portions near the outer edge. Each through hole 15d preferably has the shape of a circumferentially elongated hole. As a matter of course, the through hole 15d may be substantially circular or have another suitable shape.

When rotary motion of the crankshaft 3 rotates the rotor 15, a centrifugal force of the rotor 15 causes cooling oil "a" in the rotor 15 to pass through the through holes 15d to the outside. The flow of the cooling oil "a" thus cools the stator coil 17.

The engine 1 has a starting device 2. The starting device 2 is provided with a starter motor 20 fixedly located on an upper wall of the crankcase 4, a starter gear 22 driven by the starter motor 20 through an intermediate gear 21, the rotor (starter member) 15 connected to the crankshaft (engine starting shaft) 3, and a starter clutch 23 placed between the rotor 15 and the starter gear 22 for transmitting rotary motion from the starter gear 22 only to the rotor side.

The starter motor 20 is located substantially parallel with the crankshaft 3. An output gear 20a of the starter motor 20 passes through a through hole 4b formed in the crankcase 4 to project into the cover member 13.

The intermediate gear 21 is journaled by an intermediate shaft 21a placed across the crankcase 4 and the cover member 13, and has an intermediate large gear 21b to be meshed with the output gear 20a and an intermediate small gear 21c to be meshed with the starter gear 22.

The starter gear 22 has a cylindrical boss 22a supported by the crankshaft 3 through a bearing 25 for relative rotation.

The starter clutch 23 and the rotor 15 are formed separately from each other. The starter clutch 23 is provided with an annular outer race 26 arranged to face the flange 15b of the rotor 15, and a cam (clutch member) 27 disposed between the outer race 26 and the boss 22a of the starter gear 22. The cam 27 transmits rotary motion from the starter motor 30 side only to the outer race 26 side and accordingly to the crankshaft 3, while preventing rotary motion from the crankshaft 3 side from being transmitted to the starter motor 20 side.

An outer diameter of the outer race 26 is set to such a large value as to allow the outer race 26 to axially face the through holes 15d formed in radially outer regions of the flange 15b of the rotor 15. This ensures a rigidity that is sufficient to tolerate a maximum transmission torque imparted on the outer race 26.

A plurality of bolt holes 26a circumferentially spaced at regular intervals are formed in a radially outer portion of the outer race 26. A positioning portion 15e, onto which a circular fitting portion 26b of the outer race 26 is to be fitted, is formed on a surface, which is opposed to the outer race 26, of the flange 15b. The outer ring 26 is radially positioned by fitting the fitting portion 26b onto the positioning portion 15d, and positioned and fixed to the rotor 15 for rotation with the rotor 15 by fastening bolts 28 inserted into bolt holes 26a to the flange 15b.

Thinned portions 26c are formed on the outer race 26 at portions facing the through holes 15d. Each thinned portion 26c is thinner than a portion of the outer race 26 near the cam 27. A stepped section S is formed with a step portion 15e', of the rotor 15, projecting toward the outer race, and each thinned portion 26c. The stepped section S is positioned between a periphery edge of each through hole 15d of the rotor 15 and the surface, which is opposed to the through hole 15d of the rotor, of the outer race 26. In other words, the stepped section S is positioned between a radially outer portion Do of the outer race 26, the portion opposed to the through hole 15d at least at a radially distal end portion from the center of the starter member 15, and a radially inner portion Di of the outer race 26 near the clutch member 27. The stepped section S is desirably dimensioned large enough not to interfere with an air flow generated in response to passage of the cooling oil "a" through the through hole 15d. The thinned portion 26c may be designed to define the stepped section S between at least a radially outer edge 15d" positioned at a radially distal end of the peripheral edge of the through hole 15d and the opposing surface of the outer race 26.

The thinned portion 26c is preferably formed by forging and axially overlaps with the through hole 15d. An axial thickness of the thinned portion 26c is substantially equal to or greater than about ½ of the axial thickness of a rotor fastening portion, which is the remaining portion of the outer race 26. The surface, which is opposed to the through hole 15a, of the thinned portion 26c and an axially outer surface of the ring gear 22 are different in level by a distance of S1. This prevents the ring gear 22 from hindering the flow of the cooling oil passing through the stepped section S.

An radially inner edge 26c' of the thinned portion 26c and a radially inner edge 15d' of the through hole 15d substantially coincide with each other in the direction that is substantially perpendicular to the axial direction of the crankshaft. The inner edge 26c' of the thinned portion 26c is rounded so as to be tilted outwardly radially. A radially outer edge 26c" of the thinned portion 26c and the radially outer edge 15d" of the through hole 15d substantially coincide with each other in the direction that is substantially perpendicular to the axial direction of the crankshaft.

When a main key switch (not shown) is operated, rotary motion of the starter motor 20 is reduced in speed through the intermediate large gear 21b and the intermediate small gear 21c and then transmitted to the starter gear 22. Rotary motion of the starter gear 22 is transmitted to the outer race 26 through the cam 27. The outer race 26 rotates the crankshaft 3 through the rotor 15. After the engine has been started, since the cam 27 is at idle, rotary motion of the crankshaft 3 is not transmitted to the starter motor 20 side.

When rotary motion of the crankshaft 3 rotates the rotor 15, a centrifugal force of the rotor 15 causes the air or the cooling oil "a" in the rotor 15 to enter the stepped section S through the through hole 15d and flow to the outside. This flow of the oil or the like cools the stator coil 17.

According to this preferred embodiment, since the stepped section S is defined between each through hole 15d of the rotor 15 and the surface, which is opposed to the rotor 15, of the outer race 26, even when the outer race 26 is dimensioned to oppose the through hole 15d, blockage of the through hole 15d is prevented. This allows to ensure a sufficient flow of the air or the cooling oil "a" passing though the through hole 15d, thereby enhancing the cooling capability of the stator coil 17.

In addition, the outer race 26 can be formed to have such a large diameter so as to allow the outer race 26 to axially face the through holes 15d formed in the rotor 5 at radially outer portions thereof. This allows for an increase in the rigidity required to tolerate a maximum transmission torque. As a result, slippage of the cam 27 due to deformation of the outer race 26 is prevented, which allows smooth engine starting.

In this preferred embodiment, the stepped section S is defined by forming the outer race 26 and the rotor 15 separately and forming the thinned portion 26c on the outer race 26. Hence, ensuring the stepped section S large enough to allow the air or the cooling oil "a" to pass through the through holes 15d is attained, while ensuring the rigidity of the outer race 26.

Since each thinned portion 26c and each through hole 15d are formed to axially overlap with each other, and the thinned portions 26c are formed only at portions required for causing the cooing oil "a" to pass through, the rigidity of the outer race 26 is ensured.

Since the thinned portions 26c are preferably formed by forging, the thinned portions 26c can be formed simultaneously with the outer race 26. This allows for a reduction in cost as compared to a case in which the thinned portions 26c are separately formed by machining, or the like.

In this preferred embodiment, since the radially inner edge 15d' of the through hole 15d and the radially inner edge 26c' of the thinned portion 26c substantially coincide with each other radially, the air or the cooling oil "a" passes through the through hole 15d more smoothly.

Figure 5:
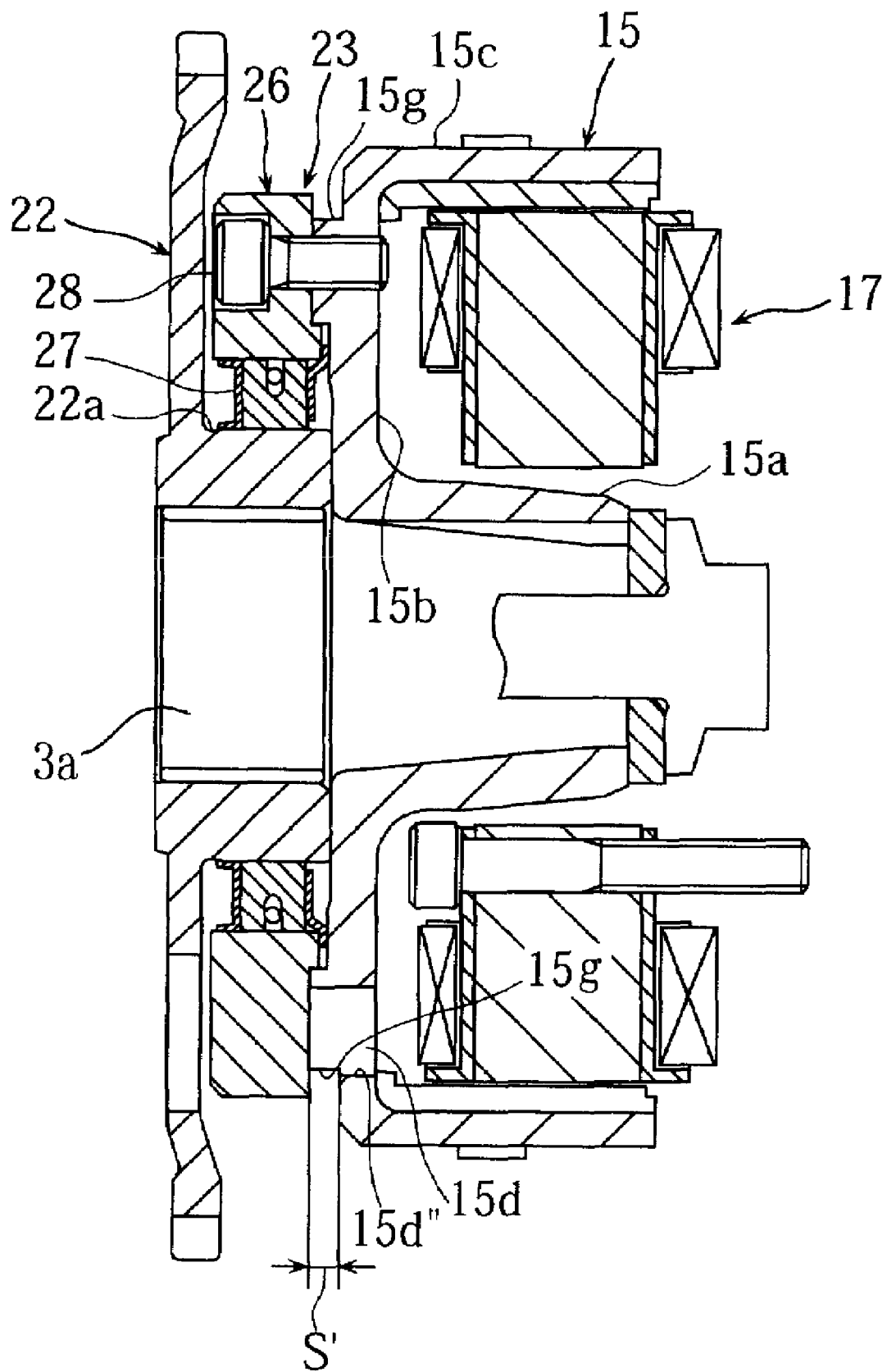
FIG. 5 is a cross-sectional view of a starting device according to a second preferred embodiment of the present invention.
Figure 6:
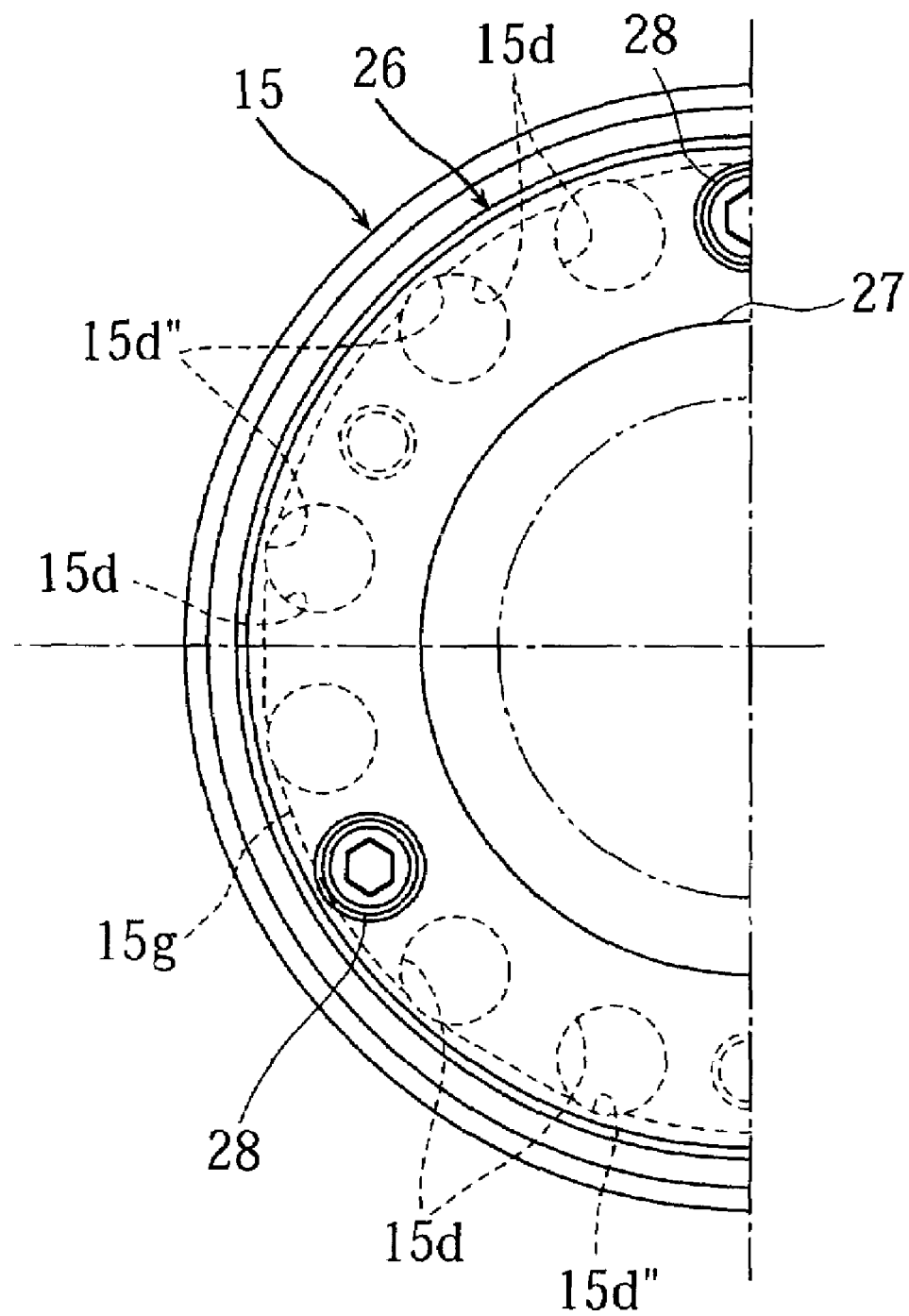
FIG. 6 is a side view of the starting device as viewed in the axial direction of the crankshaft.

FIGS. 5 and 6 illustrate a starting device according to a second preferred embodiment of the invention. In the drawings, identical or similar reference numerals to those in FIGS. 3 and 4 designate identical or similar elements.

In this preferred embodiment, a stepped section S' is provided between the outer edge 15d'' of the peripheral edge of the through hole 15d of the rotor 15 at the radially distal end from the center of the rotor, and the surface, which is opposed to the through hole 15d or the rotor, of the outer race 26. This preferred embodiment preferably is substantially identical in basic configuration to the first preferred embodiment.

The stepped section S' is provided by forming a step portion 15g projecting toward the outer race 26 on a surface, which is opposed to the outer race 26, of the rotor 15. The step portion 15g is formed by reducing the thickness of an outer peripheral edge portion of the opposing surface on the rotor 15 relative to the remaining portion. In other words, the stepped section S' causes the portion of the starter member 15 in which the through hole 15d is formed to be thinner than the portion of the starter member 15 near the engine starting shaft. The radially outer edge 15d'' of the through hole 15d is positioned outside an outer circumferential surface of the step portion 15g.

In the second preferred embodiment, since the stepped section S' is formed with the step portion 15g formed on the surface, which is opposed to the outer race 26, of the rotor 15, the outer race 26 is allowed to have a sufficient axial thickness. Hence, the rigidity for tolerating a maximum transmission torque can be further increased.

Figure 7:
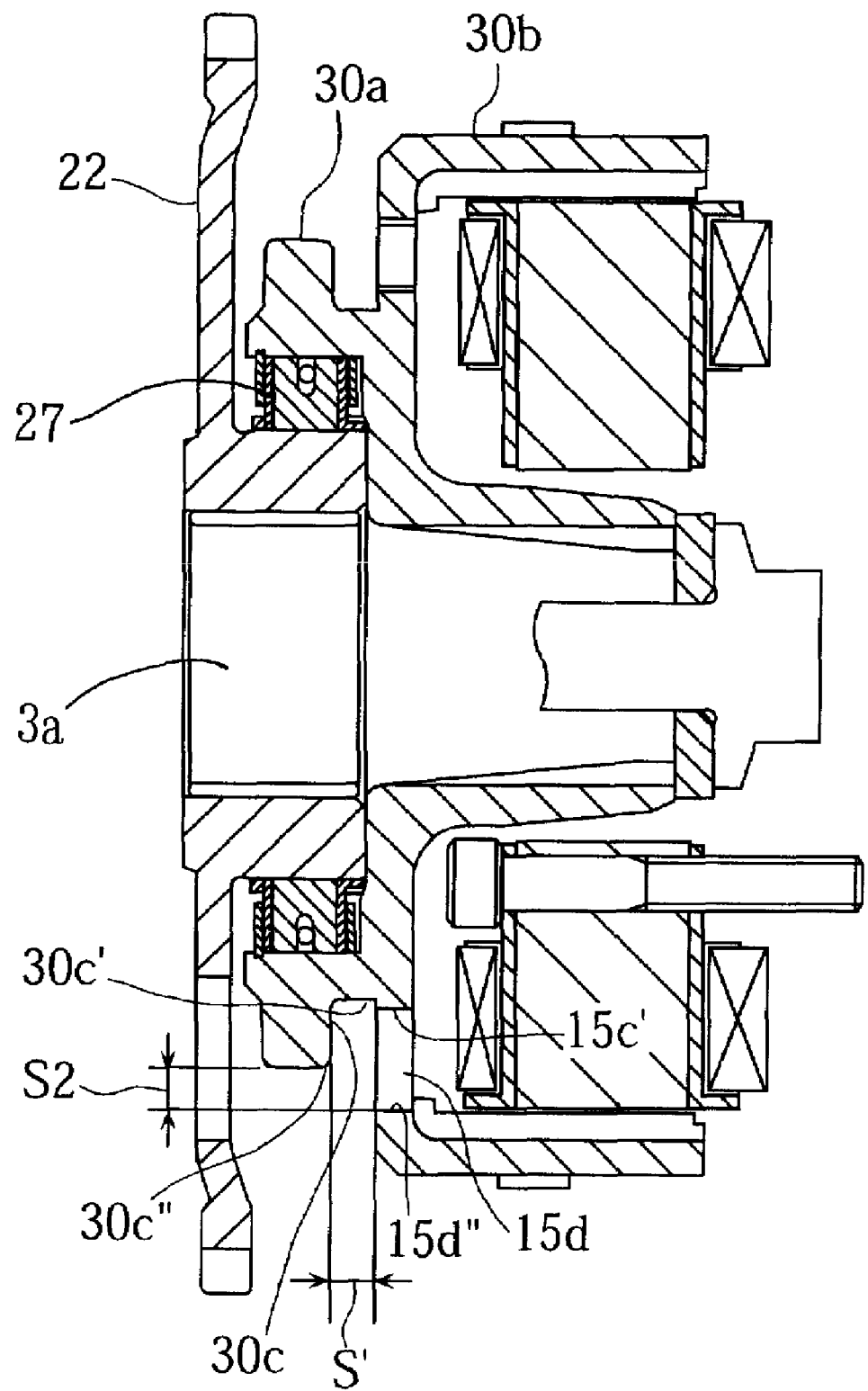
FIG. 7 is a cross-sectional view of a starting device according to a third preferred embodiment of the present invention.
Figure 8:
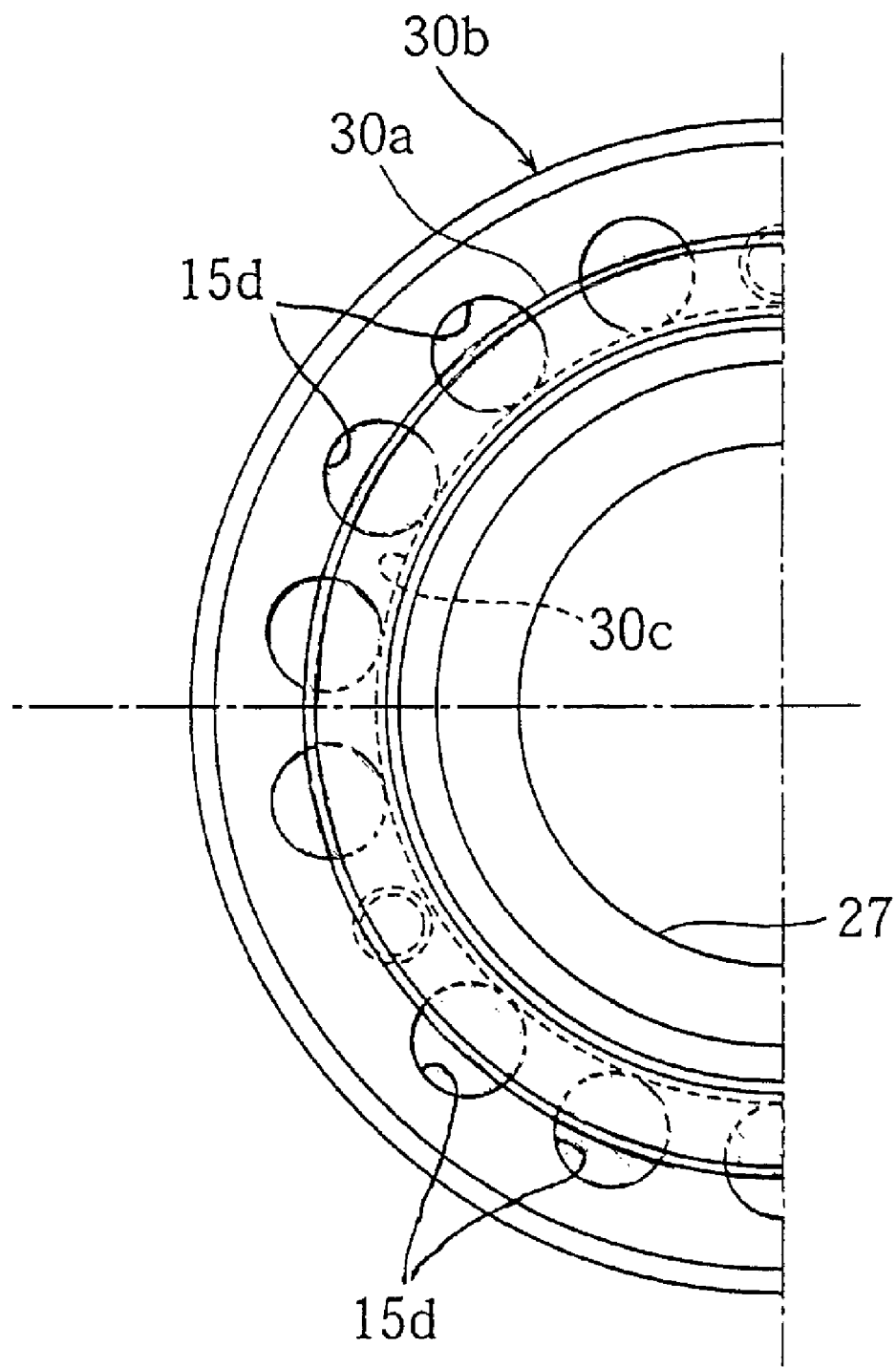
FIG. 8 is a side view of the starting device as viewed in the axial direction of the crankshaft.

FIGS. 7 and 8 illustrate a starting device according to a third preferred embodiment of the invention. In the drawings, identical or similar reference numerals to those in FIGS. 3 to 6 designate identical or similar elements.

This preferred embodiment is an example in which an outer race 30a and a rotor 30b are formed in one unit or as a single unitary member, and the stepped section S' is formed with a recess 30c provided in a radially outer portion of the outer race 30a. The recess 30c is a recessed groove provided at the boundary between the outer race 30a and the rotor 30b around an entire periphery of the outer race 30a. The recess 30c overlaps with the through holes 15d in the axial direction of the crankshaft.

The radially inner edge 15d' of the through hole 15d and a radially inner edge (bottom surface) 30c' of the recess 30c substantially coincide with each other radially. A radially outer edge (open end surface) 30c'' of the recess 30c is positioned radially inside the radially outer edge 15d'' of the through hole 15d. Hence, the radially outer edge 15d'' of the through hole 15d and the radially outer edge 30c'' define an axial gap S2 therebetween.

In the third preferred embodiment, since the stepped section S' is formed with the recess 30c provided in the radially outer portion of the outer race 30a, the rigidity of the outer race 26 can be increased, which allows to smoothly start the engine. In addition, the stepped section S' allows to ensure sufficient flow of the air or the cooling oil. Hence, substantially the same effect as that yielded by the first preferred embodiment is achieved.

In this preferred embodiment, since the outer race 30a and the rotor 30b are preferably constructed as one integral unit or a single unitary member, and the recess 30c is provided by the recessed groove around the entire periphery of the outer race 30a, a reduction in the number of parts is attained.

In this preferred embodiment, the radially inner edge 15d' of the through hole 15d and the radially inner edge 30c' of the recess 30c substantially coincide with each other radially, and the radially outer edge 30c'' of the recess 30c is positioned radially inside the radially outer edge 15d'' of the through hole 15d. This allows the air or the cooling oil to flow both through the stepped section S' in the axial direction and through the gap S2 in the direction that is substantially perpendicular to the axial direction, to thereby further enhance the cooling capability.

Figure 9:
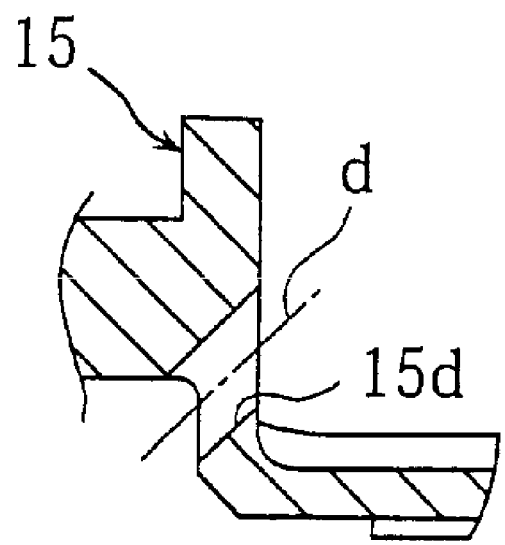
FIG. 9 is a cross-sectional view of a through hole according to a modification of the third preferred embodiment of the present invention.

In the preferred embodiments described above, each through hole 15d of the rotor 15 is preferably arranged to have its axis parallel or substantially parallel to the axis of the crankshaft. However, as shown in FIG. 9, the through hole 15d may be formed such that an axis "d" of the through hole 15d is oriented diagonally to cross the axis of the crankshaft. In other words, such that a downstream opening of the through hole 15d is oriented outward. This arrangement allows the cooling oil to flow more smoothly.

In each of the various preferred embodiments of the present invention, description has been made of the example in which the crankshaft 3 is the engine starting shaft and the rotor 15 is the starter member. However, the engine starting shaft and the starting member of the present invention are not limited to the crankshaft and the rotor, respectively.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A starting device of an engine, comprising:
  a starter gear driven by a starter motor;
  a starter member connected to an engine starting shaft, the engine starting shaft defining an axial direction of the starting device; and a starter clutch located between the starter member and the starter gear to transmit rotary motion from the starter gear only to a side of the starter member; wherein the starter clutch is provided with an outer race that rotates with the starter member, and a clutch member interposed between the outer race and the starter gear;

the starter member has a through hole formed therein so as to oppose the outer race in the axial direction;

a stepped section is defined between a radially outer portion of the outer race which faces a radially outer edge of a periphery of the through hole and a radially inner portion of the outer race which is in contact with the clutch member; and the stepped section defines a contour of the outer race such that the radially outer portion of the outer race is thinner in the axial direction than the radially inner portion of the outer race.

2. The starting device of an engine according to claim 1, wherein the outer race and the starter member are separate elements, and the stepped section has a thinned portion located on a surface of the outer race facing the starter member such that air and/or oil can pass through the through hole and an empty space defined by the thinned portion of the outer race.

3. The starting device of an engine according to claim 2, wherein the thinned portion axially overlaps with the through hole.

4. The starting device of an engine according to claim 2, wherein the thinned portion is made of a forged material.

5. The starting device of an engine according to claim 2, wherein a radially inner edge of the through hole and a radially inner edge of the thinned portion substantially coincide with each other radially.

6. The starting device of an engine according to claim 1, wherein the outer race and the starter member are defined by a single integral unitary member, the stepped section includes a recess formed in an outer peripheral portion of the outer race, and the recess axially overlaps the through hole.

7. The starting device of an engine according to claim 6, wherein the recess is a recessed groove disposed around the radially outer portion of the outer race.

8. The starting device of an engine according to claim 6, wherein a radially inner edge of the through hole and a radially inner edge of the recess substantially coincide with each other radially.

9. The starting device of an engine according to claim 1, wherein the engine starting shaft is a crankshaft, and the starter member is a rotor of a generator attached to the crankshaft.

10. A starting device of an engine, comprising:

a starter gear driven by a starter motor;

a starter member connected to an engine starting shaft, the engine starting shaft defining an axial direction of the starting device; and a starter clutch located between the starter member and the starter gear to transmit rotary motion from the starter gear only to a side of the starter member; wherein the starter clutch is provided with an outer race that rotates with the starter member, and a clutch member interposed between the outer race and the starter gear;

the starter member has a through hole arranged to oppose the outer race in the axial direction;

a cut-out section is defined between a radially outer portion of the outer race which faces a radially outer edge of a periphery of the through hole and a radially inner portion of the outer race that is in contact with the clutch member; and the cut-out section defines a contour of the outer race such that the radially outer portion of the outer race is thinner in the axial direction than the radially inner portion of the outer race.

11. The starting device of an engine according to claim 10, wherein the outer race and the starter member are separate elements, and the cut-out section defines a thinned portion located on a surface of the outer race facing the starter member such that air and/or oil can pass through the through hole and an empty space defined by the thinned portion of the outer race.

12. The starting device of an engine according to claim 11, wherein the thinned portion axially overlaps with the through hole.

13. The starting device of an engine according to claim 11, wherein the thinned portion is made of a forged material.

14. The starting device of an engine according to claim 11, wherein a radially inner edge of the through hole and a radially inner edge of the thinned portion substantially coincide with each other radially.

15. The starting device of an engine according to claim 10, wherein the outer race and the starter member are defined by a single integral unitary member, the cut-out section includes a recess formed in an outer peripheral portion of the outer race, and the recess axially overlaps the through hole.

16. The starting device of an engine according to claim 15, wherein the recess is a recessed groove disposed around the radially outer portion of the outer race.

17. The starting device of an engine according to claim 15, wherein the a radially inner edge of the through hole and a radially inner edge of the recess substantially coincide with each other radially.

18. The starting device of an engine according to claim 10, wherein the outer race and the starter member are separate elements, the cut-out section includes a step portion provided on a surface of the starter member facing the outer race, so as to project toward the outer race, and a radially outer edge of the through hole is positioned outside an outer circumferential surface of the step portion.

19. The starting device of an engine according to claim 10, wherein the engine starting shaft is a crankshaft, and the starter member is a rotor of a generator attached to the crankshaft.

20. The starting device of an engine according to claim 1, wherein the starter member includes an annular rotor, a magnet is attached to an inner surface of the rotor, and the radially outer portion of the outer race extends radially so as to overlap the magnet in the axial direction.

21. The starting device of an engine according to claim 10, wherein the starter member includes an annular rotor, a magnet is attached to an inner surface of the rotor, and the radially outer portion of the outer race extends radially so as to overlap the magnet in the axial direction.

* * * * *